UNITED STATES PATENT OFFICE.

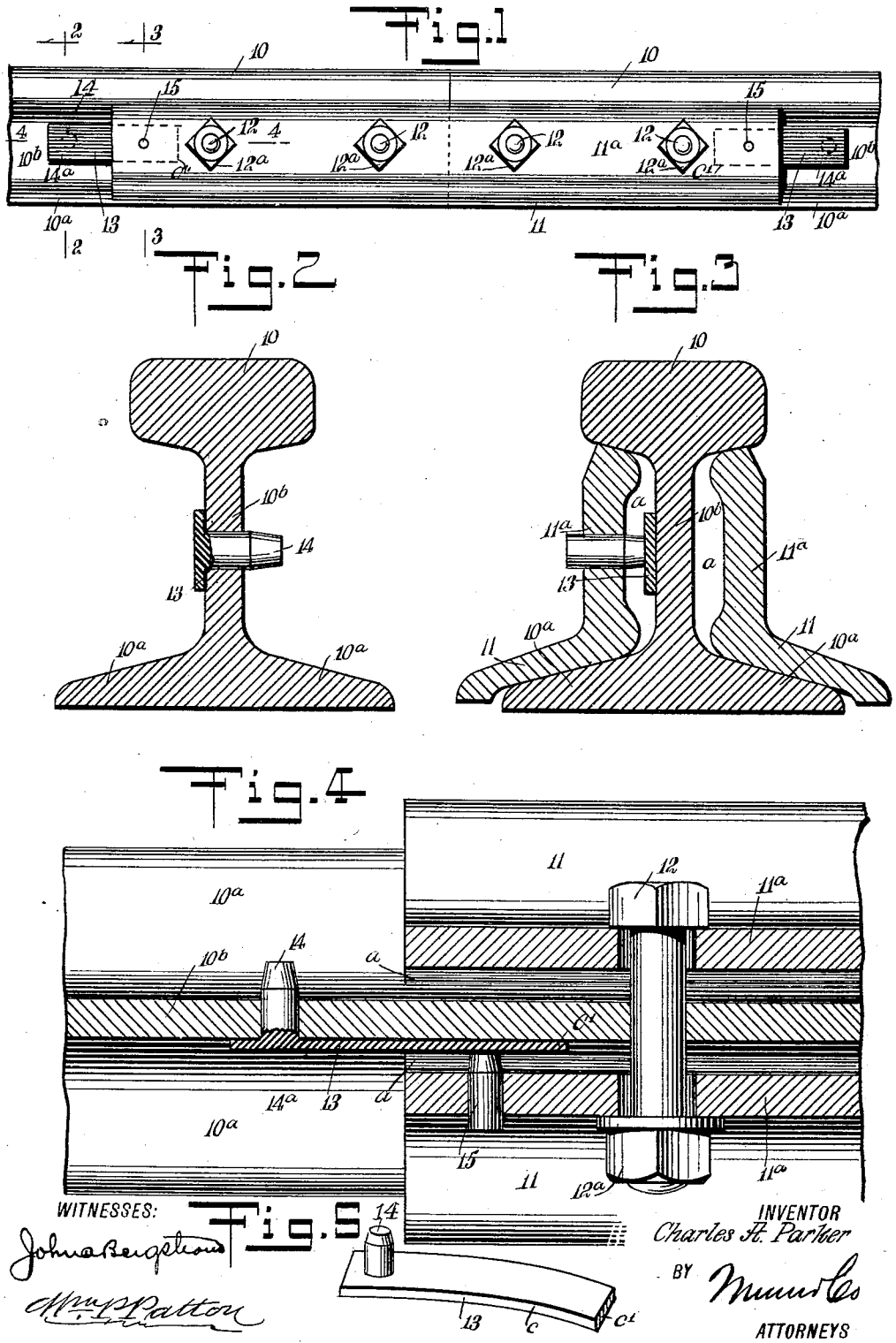

CHARLES A. PARKER, OF FORT FRED STEELE, WYOMING, ASSIGNOR OF ONE-HALF TO RAY V. EVANS, OF RAWLINS, WYOMING.

TRACK-RAIL BOND FOR RAILWAYS.

969,115. Specification of Letters Patent. Patented Aug. 30, 1910.

Application filed December 21, 1909. Serial No. 534,338.

*To all whom it may concern:*

Be it known that I, CHARLES A. PARKER, a citizen of the United States, and a resident of Fort Fred Steele, in the county of Carbon and State of Wyoming, have invented a new and Improved Track-Rail Bond for Railways, of which the following is a full, clear, and exact description.

The purpose of my invention is to provide a novel track rail bond for railways, which is extremely simple, is durable, readily applied, compensates for the expansion and contraction of track rails and fish plates that connect said rails at their joints, and maintains ample electrical conductivity under all conditions of service.

The invention consists in the novel construction and combination of parts, as is hereinafter described and defined in the appended claims.

Reference is to be had to the accompanying drawings forming a part of this specification, in which similar characters of reference indicate corresponding parts in all the views.

Figure 1 is a side view of the end portions of two track rails, connected together by fish plates, and of the improved electric bond device mounted on the webs of the track rails; Fig. 2 is an enlarged transverse sectional view of one track rail, and of a detail of the invention secured thereon, taken on the line 2—2 in Fig. 1; Fig. 3 is an enlarged transverse sectional view of a track rail, two fish plates secured thereon, and a detail of the invention engaging one fish plate and contacting with the web of the track rail, the section being taken on the line 3—3 in Fig. 1; Fig. 4 is a section on the line 4—4 in Fig. 1; and Fig. 5 is a perspective view of a contact plate that is a detail of the invention.

In the drawings that represent the improvement and its practical application, 10, 10, indicate the end portions of two T-rails of a railroad, each comprising a ball or head portion, two base flanges $10^a$, and a web $10^b$ that connects the head and base flanges as usual. Two similar clamps known as fish plates, are shown as a preferred means for securing the track rails 10 together at adjacent ends thereof, said fish plates each comprising a bottom plate 11 and an integral upright plate member $11^a$, that diverges from the bottom plate at an angle, which adapts the bottom plate to have contact with a base flange $10^a$, while the upright plate member engages the head or ball of the track rail on its lower side, as is shown in Fig. 3. To reduce the weight of the fish plates, the upright members thereof are recessed in their sides that in use are nearest to the webs $10^b$ of the track rails, thus affording a channel $a$ between each fish plate and the track rail it engages. The fish plates are secured upon the webs of the track rails by the bolts 12 and nuts $12^a$ that engage their threaded ends, four bolts being employed that pass through spaced perforations in the upright members $11^a$ of the fish plates and opposite perforations in the webs $10^b$ of the track rails.

The improvement, that forms a positive electrical connection between the webs $10^b$ of two track rails that are connected mechanically by the fish plates which have been described, consists of the following details: Two similar contact plates 13, are provided, each being preferably formed of resilient metal in the shape of strips having suitable width and thickness, and from each contact plate near the respective ends thereof, a stud 14 projects, which is preferably formed integral with said plate.

The contact plates 13, are inserted in the recess $a$, between the webs of the rails and one of the fish plate members $11^a$, and the studs 14 are secured in perforations in the webs $10^b$ of the track rails 10. The contact plates 13, are each curved laterally a proper degree, as shown at $c$ in Fig. 5, and thus have one side of each one rendered convex, said convex side being seated upon the web upon which said plate is secured; and it will be understood that when the stud 14 is driven through the web of a respective track rail, the contact plate will have the free end $c'$ thereof pressed toward the rail web upon which said plate is secured.

Opposite the free end of each contact plate 13, a perforation is formed in the upright member $11^a$, said perforations respectively receiving a metal contact pin 15, that is driven through the fish plate member and bears upon the concave side of the contact plate to which it is opposite, as shown clearly for one plate and pin in Figs. 3 and 4. The frictional contact of the pins 15 within the perforations serves to retain them in place, so that their inserted ends will press upon the concave curved end portions of the contact plates 13 and flatten them toward the webs of the track rails.

It will be evident that the frictional contact, of the ends $c'$ of the contact plates 13 upon the surfaces of the rail webs $10^b$, will insure a positive electrical contact between the free ends of the plates 13 and the rail webs $11^a$, the tension of the compressed ends $c'$ of the contact plates, enforcing such an electrical contact when the track rails and fish plates are shifted longitudinally by their expansion and contraction, due to the changes in temperature to which they are exposed.

It will be noted that the device may be readily detached, if this is desired, and be replaced at will. Also it will be apparent that the fish plates may be removed and replaced without injury to the improved bond, that will be again rendered operative when the fish plates are secured in place.

Having thus described my invention, I claim as new and desire to secure by Letters Patent:

1. An electrical track rail bond, comprising a contact plate secured near one end on a track rail web, and a contact pin projected from an adjacent fish plate and pressing upon the free end of said contact plate.

2. An electrical track rail bond, comprising a contact plate that is curved laterally and secured flatwise near one end on a track rail web, and a contact pin projected from an adjacent fish plate and pressing upon the free end of said contact plate.

3. An electrical track rail bond, comprising a resilient contact plate that is curved laterally and secured flatwise near one end on a track rail web by means of a metal stud or pin, and a metal contact pin projected from an adjacent fish plate and pressing upon the free end of said contact plate.

4. The combination with two track rails, and two fish plates that connect the ends of said track rails, of two laterally-curved resilient contact plates secured near the corresponding ends of each upon the web of a respective track rail, and a metal contact pin projected from an upright member of each fish plate into engagement with the free end of a respective contact plate.

5. In a device of the character described, the combination with two track rails, two fish plates, and means for clamping the fish plates upon the track rail webs at their meeting ends, of two laterally-curved resilient contact plates, metal pins or studs securing the contact plates near the respective ends upon the same sides of the webs on the track rails, and two metal contact pins projected laterally from the upright members of the fish plates into enforced engagement with the free ends of the contact plates and thus pressing said free ends into frictional contact with the rail webs.

In testimony whereof I have signed my name to this specification in the presence of two subscribing witnesses.

CHARLES A. PARKER.

Witnesses:
 HOMO MERRELL,
 RAY V. EVANS.